(12) United States Patent
Zhang (10) Patent No.: US 11,973,890 B2
(45) Date of Patent: Apr. 30, 2024

(54) HINGE ELEMENT, HINGE, AND MOBILE TERMINAL

(71) Applicant: VIVO MOBILE COMMUNICATION CO., LTD., Guangdong (CN)

(72) Inventor: Xinfu Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 294 days.

(21) Appl. No.: 17/466,847

(22) Filed: Sep. 3, 2021

(65) Prior Publication Data
US 2021/0400126 A1    Dec. 23, 2021

Related U.S. Application Data

(63) Continuation of application No. PCT/CN2020/077736, filed on Mar. 4, 2020.

(30) Foreign Application Priority Data

Mar. 4, 2019 (CN) .......................... 201910161013.X (51) Int. Cl.
*H04M 1/02* (2006.01)
*G06F 1/16* (2006.01)

(52) U.S. Cl.
CPC ........ *H04M 1/0216* (2013.01); *G06F 1/1652* (2013.01); *G06F 1/1681* (2013.01); *H04M 1/0268* (2013.01)

(58) Field of Classification Search
CPC .... G06F 1/1641; G06F 1/1652; G06F 1/1681; H04M 1/0216; H04M 1/022; H04M 1/0268

USPC ........................................................ 455/575.3
See application file for complete search history.

(56) References Cited

U.S. PATENT DOCUMENTS

| | | | |
|---|---|---|---|
| 2003/0042116 A1* | 3/2003 | Gundlach | B65G 17/38 198/851 |
| 2004/0200697 A1* | 10/2004 | Gundlach | F16G 13/07 198/853 |
| 2015/0257289 A1* | 9/2015 | Lee | G06F 1/1652 361/749 |
| 2020/0328091 A1* | 10/2020 | Kim | H01L 23/49822 |

FOREIGN PATENT DOCUMENTS

| | | |
|---|---|---|
| CN | 103228114 A | 7/2013 |
| CN | 104900153 A | 9/2015 |
| CN | 105491193 A | 4/2016 |
| CN | 205750634 U | 11/2016 |
| CN | 206596050 U | 10/2017 |
| CN | 107370848 A | 11/2017 |

(Continued)

OTHER PUBLICATIONS

International Search Report of International Application No. PCT/CN2020/077736 dated May 27, 2020.

(Continued)

*Primary Examiner* — Tan H Trinh
(74) *Attorney, Agent, or Firm* — IP & T GROUP LLP (57) ABSTRACT

A hinge element includes at least one connection hole, and the connection hole includes a first locking hole and a second locking hole that are connected to each other. A communicating position between the first locking hole and the second locking hole narrows for transition.

17 Claims, 9 Drawing Sheets

(56) References Cited

FOREIGN PATENT DOCUMENTS

| | | |
|---|---|---|
| CN | 108292150 A | 7/2018 |
| CN | 108322567 A | 7/2018 |
| CN | 207977991 U | 10/2018 |
| CN | 109973514 A | 7/2019 |
| EP | 3282341 A1 | 2/2018 |

OTHER PUBLICATIONS

Written Opinion of The International Searching Authority of International Application No. PCT/CN2020/077736 dated May 27, 2020.
First Office Action of Priority Application No. CN201910161013.X dated Dec. 9, 2019.
The Second Office Action of Priority Application No. CN201910161013.X dated Jun. 29, 2020.
Extended European Search Report for application 20766857.5 issued by the European Patent Office dated Apr. 11, 2022.

* cited by examiner

HINGE ELEMENT, HINGE, AND MOBILE TERMINAL

CROSS-REFERENCE TO RELATED APPLICATIONS

This application is a Bypass Continuation Application of PCT/CN2020/077736 filed on Mar. 4, 2020, which claims priority to Chinese Patent Application No. 201910161013.X filed on Mar. 4, 2019, which are incorporated herein by reference in their entirety.

TECHNICAL FIELD

The present disclosure relates to the field of communication device technologies, and in particular, to a hinge element, a hinge and a mobile terminal.

BACKGROUND

With the development of science and technology, portable electronic devices such as mobile phones and tablet computers have become more common. Currently, these electronic devices usually include integrated display devices, and many of them include dual displays. For example, a mobile device includes two independently arranged display devices. The two display devices can be folded or unfolded. However, a display surface formed by such a device is segmented, and visual experience is poor. Therefore, users hope to have a larger display screen for easy viewing.

SUMMARY

According to a first aspect, an embodiment of the present disclosure proposes a hinge element, including at least one connection hole. The connection hole includes a first locking hole and a second locking hole that are connected to each other, and a communicating position between the first locking hole and the second locking hole narrows for transition.

According to a second aspect, an embodiment of the present disclosure provides a hinge, including: at least two hinge elements arranged in sequence and a connecting clevis pin. Two adjacent hinge elements are rotatably connected by using the connecting clevis pin, and the connecting clevis pin is switchable between a first locking hole and a second locking hole and locked in the first locking hole or the second locking hole. When the hinge is in an unfolded state, the connecting clevis pin is locked in the first locking hole, or when the hinge is in a bent state, the connecting clevis pin is locked in the second locking hole, and a total length of the hinge in the unfolded state is less than a total length of the hinge in the bent state.

According to a third aspect, an embodiment of the present disclosure provides a mobile terminal, including:
a flexible screen, a first support, a second support, and the foregoing hinge, where the first support and the second support are both connected to the flexible screen, and two hinge elements at two ends of the hinge are respectively connected to the first support and the second support, and when the hinge is switched between the unfolded state and the bent state, the first support and the second support are close to or far away from each other to unfold or bend the flexible screen.

BRIEF DESCRIPTION OF DRAWINGS

Characteristics, advantages, and technical effects of embodiments of the present disclosure are described below with reference to the accompanying drawings.

In the accompanying drawings, the diagrams are not drawn to actual scale.

REFERENCE NUMERALS

10: hinge element; 10a: inner surface; 10b: outer surface; 100: end;
11: connection hole; 11a: first arc-shaped surface; 11b: second arc-shaped surface; 11c: third arc-shaped surface; 11d: protrusion;
110: first locking hole; 111: second locking hole;
12: concave portion;
13: sheet;
20: hinge;
30: connecting clevis pin;
40: first fastening holder;
50: second fastening holder;
60: flexible screen;
70: first support;
80: second support.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the description of the present disclosure, it should be noted that, unless otherwise specified, "a plurality of" means two or more than two, and an orientation or positional relationship indicated by the term "upper", "lower", "left", "right", "inner", "outer", or the like is merely for ease of describing the present disclosure and simplifying the description, but does not indicate or imply that an apparatus or element referred to must have a specific orientation or be constructed and operated in a specific orientation, and therefore cannot be understood as a limitation on the present disclosure. In addition, the terms "first", "second", and the like are used only for descriptive purposes, and cannot be understood as indicating or implying relative importance.

In the description of the present disclosure, it should be further noted that, unless otherwise expressly specified and limited, the term "install", "connect", and "connection" should be understood in a broad sense. For example, a connection may be a fixed connection, may be a detachable connection, or may be an integrated connection; and may be a direct connection, or an indirect connection through an intermediate medium. Those of ordinary skill in the art can understand specific meanings of the foregoing terms in the present disclosure with reference to specific circumstances.

Display manufacturers have developed a new type display, that is, a flexible display. A flexible display can be used to provide a larger display surface. However, a hinge structure used for installing a flexible screen on a mobile terminal is complex, which affects production costs of the mobile terminal.

To help better understand the present disclosure, the following describes technical solutions in the embodiments of present disclosure with reference to FIG. 1 to FIG. 12.

Figure 1:
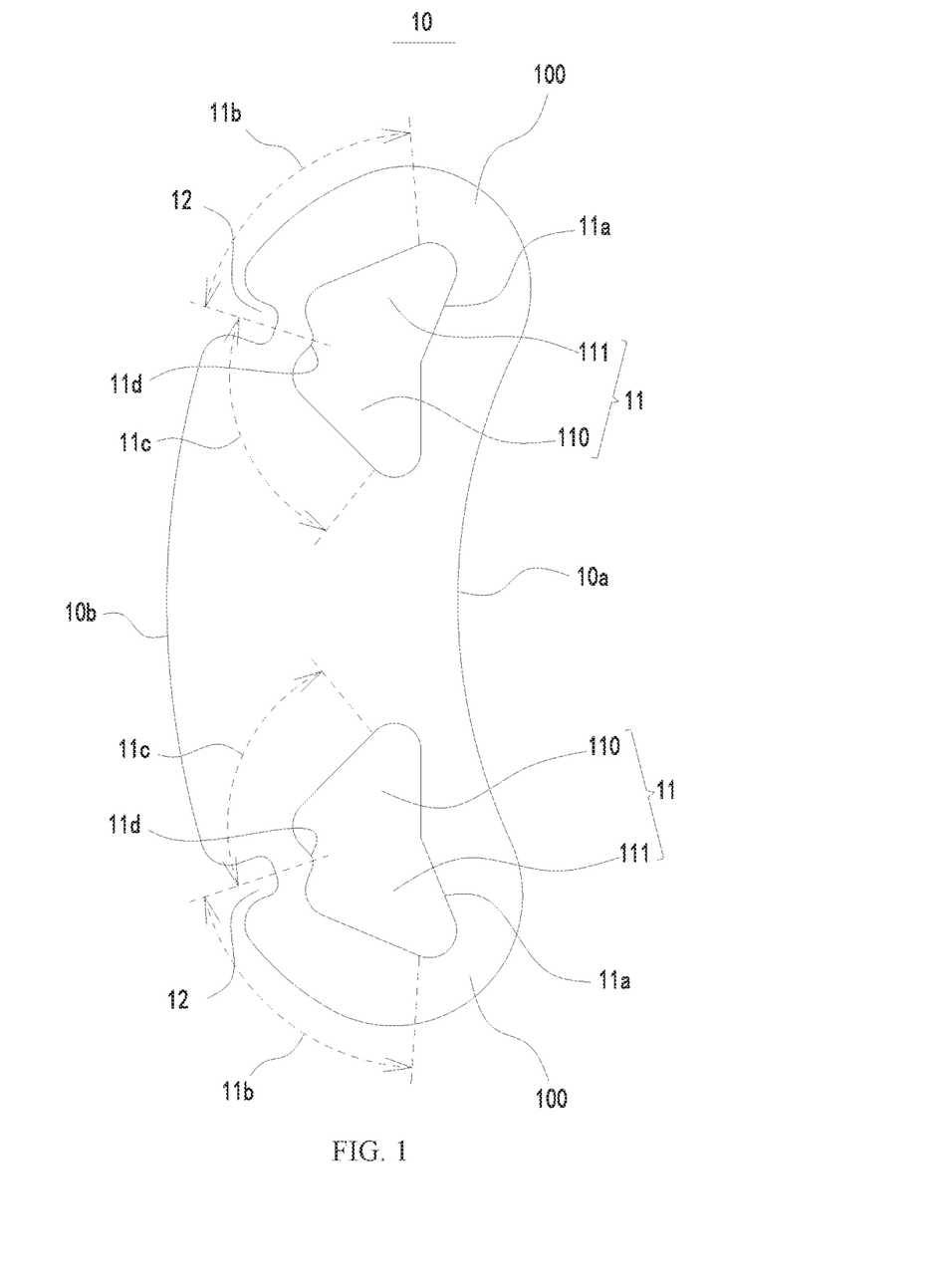
FIG. 1 is a schematic structural diagram of a hinge element according to an embodiment of the present disclosure.

FIG. 1 schematically shows a structure of a hinge element 10 according to an embodiment of the present disclosure. As shown in FIG. 1, the hinge element 10 in this embodiment has two connection holes 11. Each connection hole 11 has a first locking hole 110 and a second locking hole 111 that are connected to each other. A communicating position between the first locking hole 110 and the second locking hole 111 narrows for transition. Both ends 100 in a length direction of the hinge element 10 in this embodiment are each provided with the connection hole. The hinge element 10 in this embodiment has an inner surface 10a and an outer surface 10b on two edges in the length direction. The inner surface 10a may be a curved surface or a flat surface. Each end 100 is provided with a connection hole 11. The first locking hole 110 is close to a central area of the hinge element 10 relative to the second locking hole 111, and the second locking hole 111 is close to an edge of the end 100. In other words, in the length direction, a first distance between two first locking holes 110 is less than a second distance between two locking holes 111. The first distance is a distance between centers of the two first locking holes 110, or may be a distance between closest points of the two first locking holes 110. The second distance is similar thereto.

In one embodiment, a hole wall of the connection hole 11 includes a first arc-shaped surface 11a, a second arc-shaped surface 11b, and a third arc-shaped surface 11c. Two ends of the first arc-shaped surface 11a are respectively smoothly and transitionally connected to the second arc-shaped surface 11b and the third arc-shaped surface 11c. The first arc-shaped surface 11a and the third arc-shaped surface 11c form a hole wall corresponding to the first locking hole 110, and the first arc-shaped surface 11a and the second arc-shaped surface 11b form a hole wall corresponding to the second locking hole 111. Two mutually adjacent ends of the second arc-shaped surface 11b and the third arc-shaped surface 11c are smoothly and transitionally connected to each other and form a protrusion 11d protruding toward the first arc-shaped surface 11a. The protrusion 11d is a deformable structure, so that when the protrusion 11d is subjected to an external force, the protrusion 11d itself can be deformed to make a highest point of the protrusion 11d be away from the first arc-shaped surface 11a, and make a distance from the first arc-shaped surface 11a become larger. At the connection between the first locking hole 110 and the second locking hole 111, the highest point of the protrusion 11d corresponds to a highest point of the first arc-shaped surface 11a. The first arc-shaped surface 11a is curved toward the protrusion 11d.

In one embodiment, the second arc-shaped surface 11b includes a first circular arc segment, a second circular arc segment connected to the first circular arc segment, and a first transition segment connected to the second circular arc segment. The third arc-shaped surface 11c includes a third circular arc segment, a fourth circular arc segment connected to the third circular arc segment, and a second transition segment connected to the fourth circular arc segment. Two ends of the first circular arc segment and the third circular arc segment are smoothly and transitionally connected to form the protrusion 11d. The first transition segment and the second transition segment are respectively connected to two ends of the first arc-shaped surface 11a. In an example, the first transition segment and the first arc-shaped surface 11a are connected through circular arc transition, and the second transition segment and the first arc-shaped surface 11a are also connected through circular arc transition. On one side of a line connecting the highest point of the protrusion 11d and the highest point of the first arc-shaped surface 11a, the second circular arc segment is curved toward the outer surface 10b. A distance between a lowest point of the second circular arc segment and the highest point of the first arc-shaped surface 11a is greater than a distance between the highest point of the protrusion 11d and the highest point of the first arc-shaped surface 11a. On the other side of the line connecting the highest point of the protrusion 11d and the highest point of the first arc-shaped surface 11a, the fourth circular arc segment is also curved toward the outer surface 10b. A distance between a lowest point of the fourth circular arc segment and the highest point of the first arc-shaped surface 11a is greater than the distance between the highest point of the protrusion 11d and the highest point of the first arc-shaped surface 11a.

In an example, bending directions of the first arc-shaped surface 11a, the second arc-shaped surface 11b, and the third arc-shaped surface 11c are the same. A top surface of the protrusion 11d facing the first arc-shaped surface 11a is a circular arc surface, and a top surface of the first arc-shaped surface 11a facing the protrusion is a circular arc surface. In an example, the hinge element 10 further includes a concave portion 12 provided corresponding to the protrusion 11d. The concave portion 12 is recessed from an outer surface 10b of the hinge element 10 toward the connection hole 11. Because the concave portion 12 is disposed, an area between the concave portion 12 and the protrusion 11d of the hinge element 10 becomes thinner than another area. Therefore, the area between the concave portion 12 and the protrusion 11d of the hinge element 10 has better elasticity and deformability, so that the protrusion 11d is more easily deformed when subjected to an external force.

In one embodiment, the hinge element 10 is of an arc-shaped structure as a whole, and the outer surface 10b and the inner surface 10a are both arc-shaped surfaces. The bending directions of the first arc-shaped surface 11a, the second arc-shaped surface 11b, and the third arc-shaped surface 11c are all from the inner surface 10a to the outer surface 10b. Optionally, the hinge element 10 is of a circular arc structure as a whole, and the outer surface 10b and the inner surface 10a are both circular arc surfaces. An outer peripheral surface of the end 100 in this embodiment may be a circular arc shape. The outer surface 10b, the outer peripheral surface of the end 100, and the inner surface 10a are connected.

In one embodiment, the first locking hole 110 and the second locking hole 111 included in the hinge element 10 have a same structure, that is, has a same cross-sectional contour. Optionally, the first locking hole 110 and the second locking hole 111 are of mirror structures relative to each other. They are arranged symmetric about the line connecting the highest point of the protrusion 11d and the highest point of the first arc-shaped surface 11a.

Figure 2:
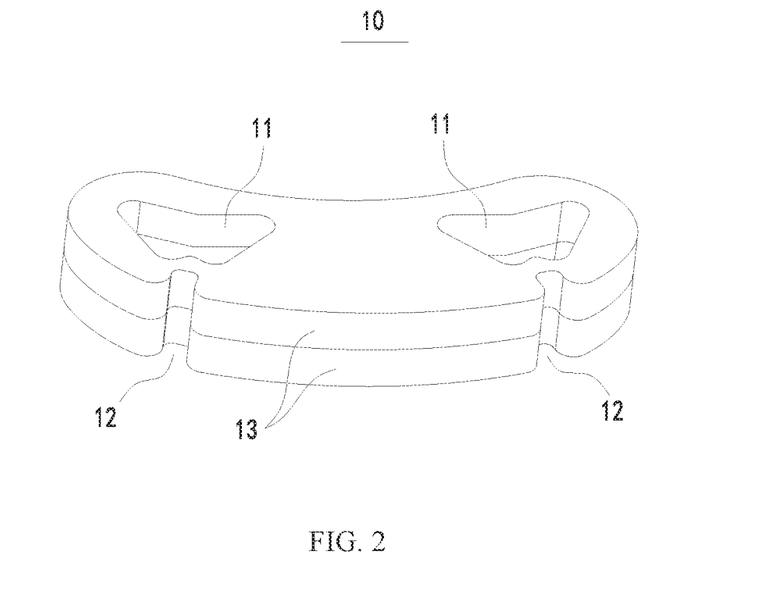
FIG. 2 is a schematic structural diagram of a hinge element according to another embodiment of the present disclosure.

In one embodiment, the hinge element 10 includes one sheet 13. The connection hole 11 extends in a thickness direction of the hinge element 10 itself and penetrates the sheet 13. In another embodiment, as shown in FIG. 2, the hinge element 10 includes at least two sheets 13, and the at least two sheets 13 are arranged in an axial direction of the connection hole 11. The connecting hole 11 extends in the thickness direction of the hinge element 10 itself and penetrates all the sheets 13.

It is easy to understand that the hinge element 10 may alternatively have one connection hole 11. In the two ends 100 included in the hinge element 10, only one end 100 may be provided with the connection hole 11 of this embodiment, and the other end is provided with a conventional structure such as a cylindrical hole.

Figure 3:
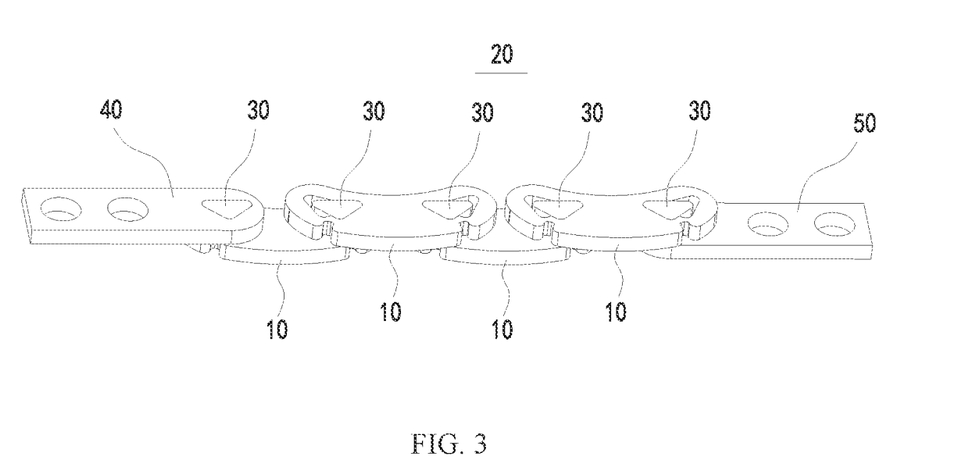
FIG. 3 is a schematic structural diagram of a hinge in an unfolded state according to an embodiment of the present disclosure.
Figure 4:
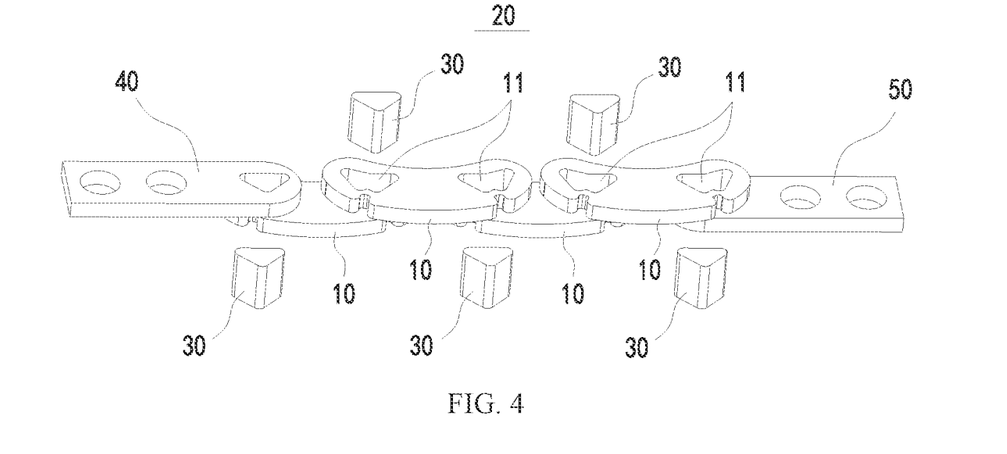
FIG. 4 is a schematic diagram of a breakdown structure of the hinge in FIG. 3.
Figure 5:
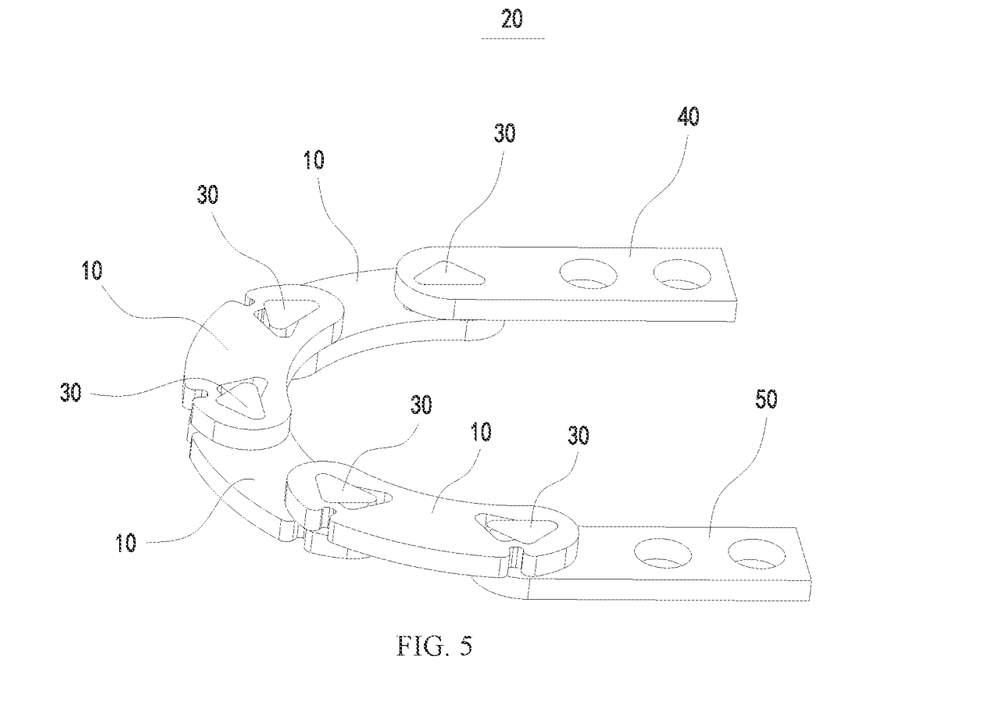
FIG. 5 is a schematic structural diagram of a hinge in a folded state according to an embodiment of the present disclosure.

FIG. 3 schematically shows a structure of a hinge 20 in an unfolded state according to an embodiment of the present disclosure. FIG. 4 shows a breakdown structure of the hinge 20 in FIG. 3. FIG. 5 schematically shows a structure of a hinge 20 in a bent state according to an embodiment of the present disclosure. As shown in FIG. 3 to FIG. 5, an embodiment of the present disclosure provides a hinge 20 applied to a mobile terminal. The hinge 20 in this embodiment includes four hinge elements 10 arranged in sequence and connecting clevis pins 30 for connecting the four hinge elements 10 in sequence. Two adjacent hinge elements 10 are rotatably connected by using one connecting clevis pin 30. Each hinge element 10 is provided with connection holes 11. The hinge element 10 in this embodiment includes two ends 100 that are opposite to each other. Each end 100 is provided with the connection hole 11. Respective ends 100 of two adjacent hinge elements 10 are stacked on each other, and their respective included connection holes 11 are aligned with each other, so that the connecting clevis pin 30 can be inserted into both the connection holes 11. Each hinge element 10 can rotate around the connecting clevis pin 30, to switch between an unfolded state and a bent state. In this embodiment, two hinge elements 10 at two ends of the hinge 20 are configured to connect to another structural member. In this embodiment, the two hinge elements 10 at two ends of the hinge 20 can be connected to another structural member through the connecting clevis pin 30.

When the hinge element 10 in this embodiment rotates around the connecting clevis pin 30, the connecting clevis pin 30 can be switched between a first locking hole 110 and a second locking hole 111 and locked in the first locking hole 110 or the second locking hole 111. When the hinge element 10 is in the unfolded state, the connecting clevis pin 30 is located in the first locking hole 110 and locked in the first locking hole 110, so that the hinge element 10 is stably kept in the unfolded state. Similarly, when the hinge element 10 is in a bent state, the connecting clevis pin 30 is located in the second locking hole 111 and locked in the second locking hole 111, so that the hinge element 10 is stably kept in the bent state. When the hinge element 10 transitions from the unfolded state to the bent state, or from the bent state to the unfolded state, the connecting clevis pin 30 needs to cross a narrowed area of the connection hole 11 and be switched between the first locking hole 110 and the second locking hole 111. In this embodiment, the first locking hole 110 is closer to a central area of the hinge element 10 than the second locking hole 111. Therefore, the connecting clevis pin 30 can move and be switched between the first locking hole 110 and the second locking hole 111, so that an axis of the connecting clevis pin 30 located in the first locking hole 110 is closer to a central area of the hinge element 10 than an axis of the connecting clevis pin 30 located in the second locking hole 111.

Figure 6:
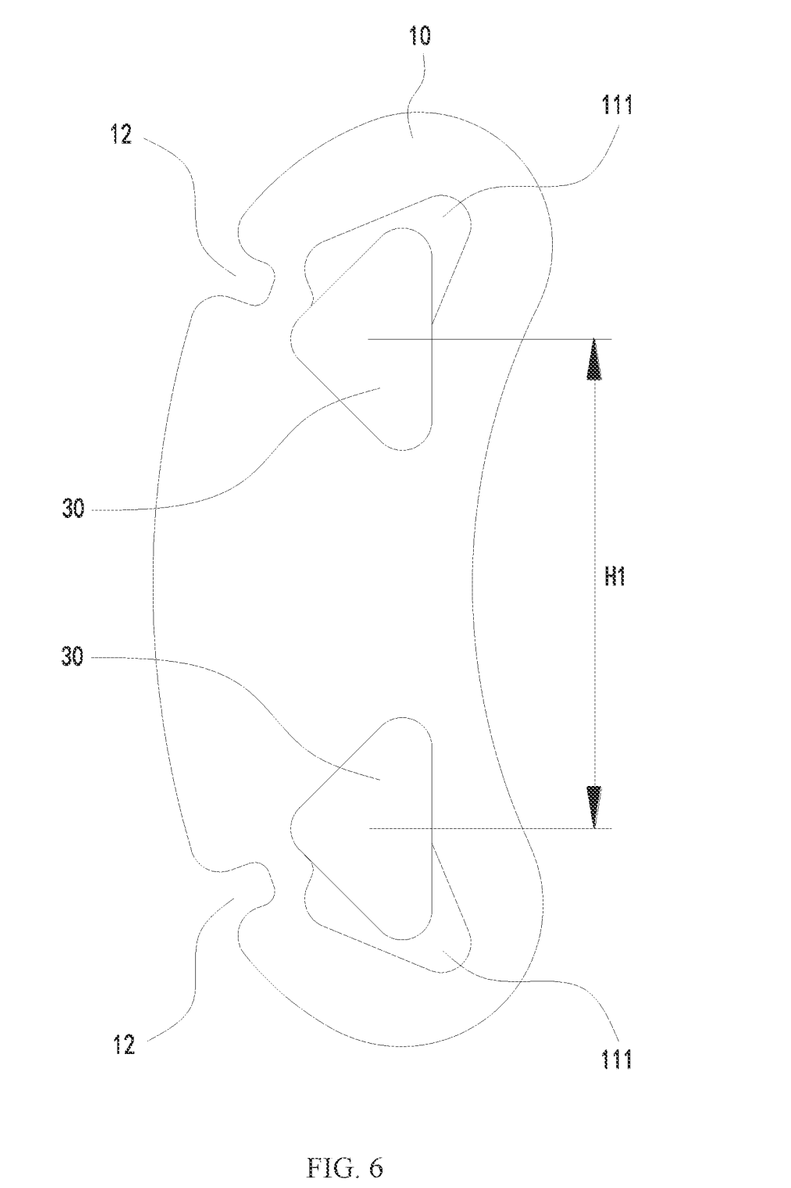
FIG. 6 is a schematic connection status diagram when a connecting clevis pin is in a first locking hole according to an embodiment of the present disclosure.
Figure 7:
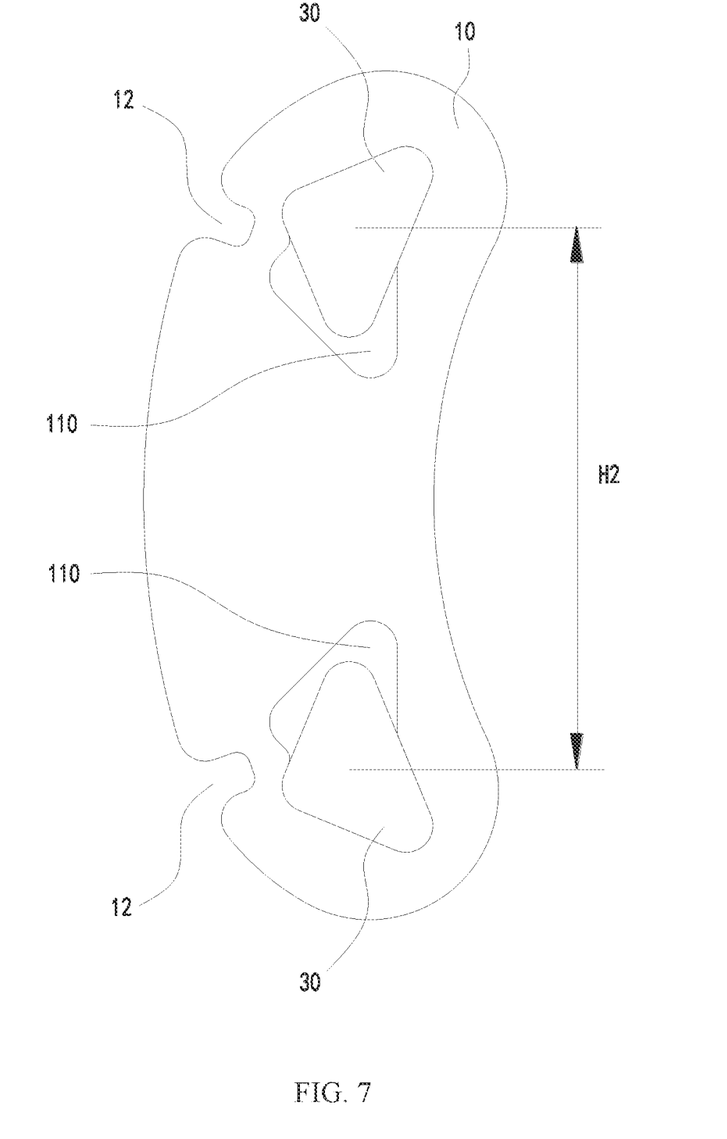
FIG. 7 is a schematic connection status diagram when a connecting clevis pin is in a second locking hole according to an embodiment of the present disclosure.
Figure 8:
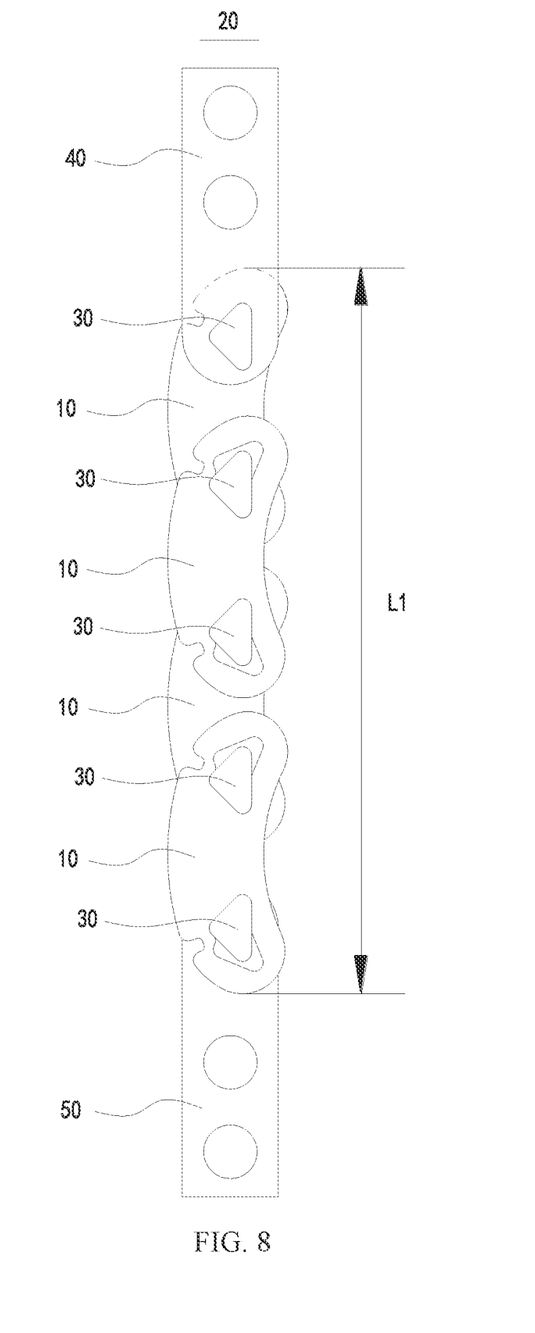
FIG. 8 is a total length of all hinge elements in an unfolded state according to an embodiment of the present disclosure.
Figure 9:
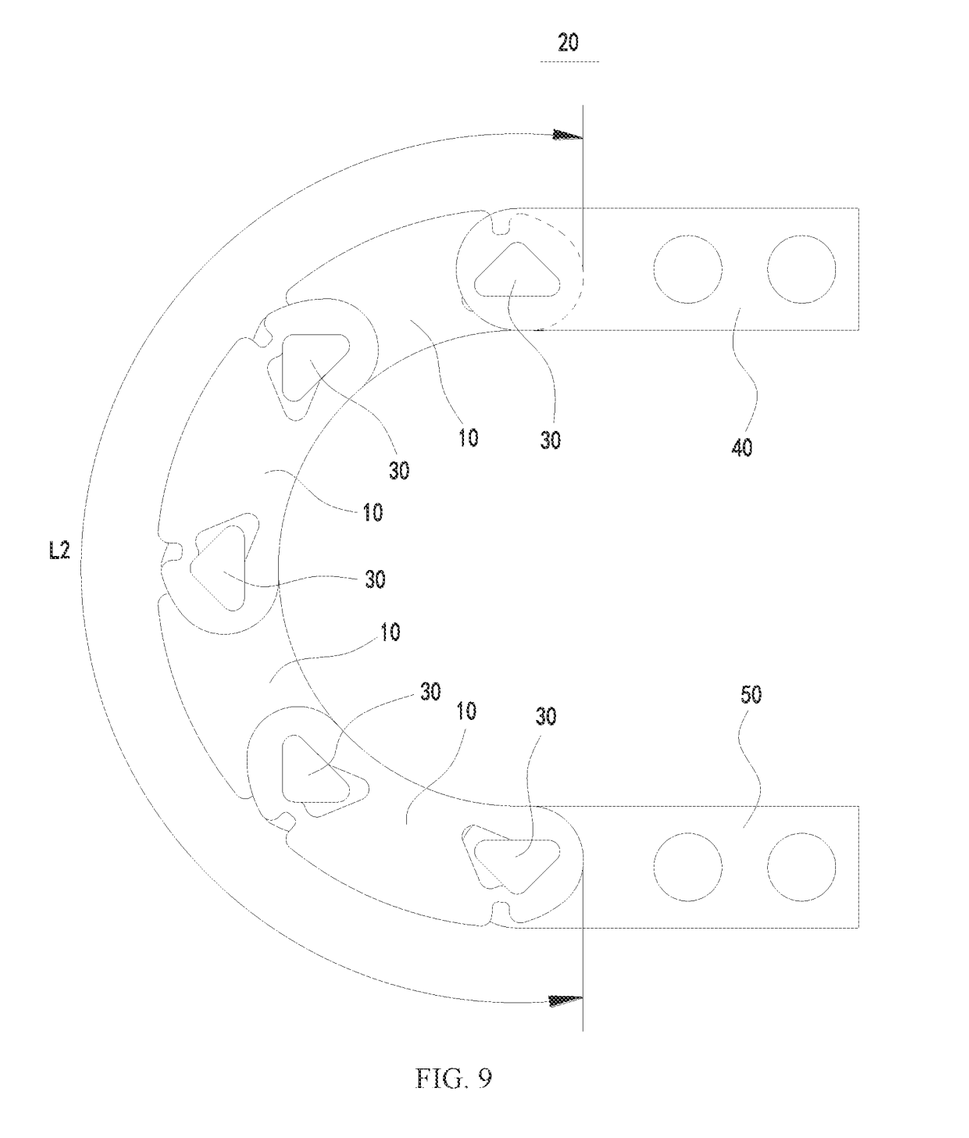
FIG. 9 is a total length of all hinge elements in a folded state according to an embodiment of the present disclosure.

In one embodiment, FIG. 6 schematically shows a connection status when a connecting clevis pin 30 is in a first locking hole 110 according to an embodiment of the present disclosure. FIG. 7 schematically shows a connection status when a connecting clevis pin 30 is in a second locking hole 111 according to an embodiment of the present disclosure. As shown in FIG. 6 and FIG. 7, the hinge 20 includes at least two connecting clevis pins 30. When the connecting clevis pin 30 is locked in the first locking hole 110, an axis distance of two connecting clevis pins 30 connected to a same hinge element 10 is H1, or when the connecting clevis pin 30 is locked in the second locking hole 111, an axis distance between the two connecting clevis pins 30 is H2. In this case, the distance H1 is less than the distance H2. Correspondingly, during transition of the hinge element 10 from the bent state to the unfolded state, two adjacent hinge elements 10 move relative to each other. FIG. 8 schematically shows a total length L1 of all hinge elements 10 in an unfolded state according to an embodiment of the present disclosure. FIG. 9 schematically shows a total length L2 of all hinge elements 10 in a bent state according to an embodiment of the present disclosure. In this way, the structural design of the hinge element 10 and the connecting clevis pin 30 in this embodiment can make the total length L1 of the hinge 20 in the unfolded state be less than the total length L2 of the hinge 20 in the bent state. When all the hinge elements 10 in this embodiment are in the unfolded state, the hinge elements 10 are roughly arranged in a straight line direction, and it is avoided that an unfolded length is equal to a folded length, preventing the hinge 20 in the unfolded state from having redundant length and wrinkles or bends.

In one embodiment, the hinge element 10 has a deformable protrusion 11d. When the connecting clevis pin 30 passes over the protrusion 11d, the connecting clevis pin 30 applies stress to the protrusion 11d to elastically deform the protrusion 11d, ensuring that the connecting clevis pin 30 can pass successfully. Because a size of the connecting clevis pin 30 is greater than a size between the highest point of the protrusion 11d and the highest point of the first arc-shaped surface 11a, after the connecting clevis pin 30 passes over the protrusion 11d, the protrusion 11d can limit the connecting clevis pin 30. Therefore, the connecting clevis pin 30 is locked in the first locking hole 110 or the second locking hole 111. In one embodiment, when the hinge element 10 is switched between the unfolded state and the bent state, the connecting clevis pin 30 can swing relative to the highest point of the first arc-shaped surface 11a, so as to switch between the first locking hole 110 and the second locking hole 111.

The hinge 20 in this embodiment of the present disclosure includes the hinge element 10 and the connecting clevis pin 30. The hinge element 10 in this embodiment has connection holes 11. The connection hole 11 has the first locking hole 110 and the second locking hole 111 that are both connected to each other. In a process when the hinge 20 is unfolded or bent, the connecting clevis pin 30 can freely move and switch between the first locking hole 110 and the second locking hole 111. When the connecting clevis pin 30 is locked in the first locking hole 110, an axis distance of two connecting clevis pins 30 connected to a same hinge element 10 is H1, or when the connecting clevis pin 30 is locked in the second locking hole 111, an axis distance H2 between the two connecting clevis pins 30 is H2. The distance H1 is less than H2. In this way, the total length L1 of the hinge 20 in the unfolded state is less than the total length L2 of the hinge 20 in the bent state, so that the hinge 20 in the unfolded state in this embodiment has no length redundancy, thereby preventing wrinkles or bends. The hinge 20 in this embodiment of the present disclosure has an overall simple structure and a small quantity of parts, processing and assembly difficulty is low, and production costs are low. When the hinge 20 in this embodiment of the present disclosure is applied to a mobile terminal with a flexible screen, because the hinge 20 has no wrinkles or bends, a possibility of damage to a structure of the flexible screen 60 caused by the hinge 20 applying local stress to the flexible screen can be reduced.

It is easy to understand that a quantity of hinge elements 10 and a quantity of connecting clevis pins 30 in this embodiment are not limited to the quantities shown in the figures. The quantity of hinge elements 10 can alternatively be two, three, or at least five, and the quantity of connecting clevis pins 30 configured to connect the hinge elements 10 can alternatively be one, two, or at least four. The quantity of hinge elements 10 and the quantity of connecting clevis pins 30 can be flexibly selected according to actual product requirements.

In one embodiment, in two ends 100 included in the hinge element 10, only one end 100 may be provided with the connection hole 11 of this embodiment, and the other end is provided with a conventional structure such as a cylindrical hole. The end 100 provided with the connection hole 11 of this embodiment is connected by using the connecting clevis pin 30 of this embodiment, and the end 100 provided with the cylindrical hole is connected by using a cylindrical clevis pin.

The first locking hole 110 and the second locking hole 111 in this embodiment have a same structure and are disposed symmetrically. Both the first locking hole 110 and the second locking hole 111 are consistent in terms of structures, which helps improve stability and smoothness of switching of the connecting clevis pin 30 between the first locking hole 110 and the second locking hole 111, and reduce a possibility of occurrence of jamming or noise during a switching process. In addition, difficulty of processing and manufacturing the connection hole 11 can be reduced.

A portion of the connecting clevis pin 30 in this embodiment is located in the first locking hole 110 or the second locking hole 111. When the connecting clevis pin 30 in this embodiment is locked in the first locking hole 110, a portion of the connecting clevis pin 30 is located in the first locking hole 110, and another portion extends into the second locking hole 111. Likewise, when the connecting clevis pin 30 in this embodiment is locked in the second locking hole 111, a portion of the connecting clevis pin 30 is located in the second locking hole 111, and another portion extends into the first locking hole 110. The portion of the connecting clevis pin 30 located in the first locking hole 110 or the second locking hole 111 matches a shape of the first locking hole 110 or the second locking hole 111 and can fit each other, so that there is no clearance between the connecting clevis pin 30 and a hole wall of the first locking hole 110 or a hole wall of the second locking hole 111, and the connecting clevis pin 30 is restricted and unable to waggle relative to the first locking hole 110 or the second locking hole 111. This effectively improves position stability of the connecting clevis pin 30, thereby improving position stability of each hinge element 10, and reducing possibility of a waggle of the hinge element 10.

Refer to FIG. 4 and FIG. 6 together. A cross section of the connecting clevis pin 30 in this embodiment is in a shape of a triangle, and a vertex angle and two base angles of the triangle are arc-shaped for transition. An outer peripheral surface of the connecting clevis pin 30 can closely fit the first arc-shaped surface 11a and the third arc-shaped surface 11c corresponding to the first locking hole 110, or closely fit the first arc-shaped surface 11a and the second arc-shaped surface 11b corresponding to the second locking hole 111. Optionally, the cross section of connecting clevis pin 30 is an isosceles triangle. It is easy to understand that a cross-sectional shape of the connecting clevis pin 30 is not limited to the triangle shown in FIG. 4 or FIG. 6, and may alternatively be a shape capable of implementing a same function, such as a hexagon. Similarly, it needs to be ensured that a cross-sectional shape of the first locking hole 110 or the second locking hole 111 matches the cross-sectional shape of the connecting clevis pin 30.

As shown in FIG. 6, the hinge element 10 in this embodiment has a concave portion 12 provided corresponding to the protrusion 11d. When the connecting clevis pin 30 passes over the protrusion 11d, the connecting clevis pin 30 can more easily deform the protrusion 11cd, so that the connecting clevis pin 30 can pass over the protrusion 11d more successfully and more effortless.

In one embodiment, the hinge element 10 is of an arc-shaped structure. Because an inner surface 10a and an outer surface 10b of the hinge element 10 are both circular arc surfaces, when all hinge elements 10 are in the bent state, inner surfaces 10a and outer surfaces 10b of all the hinge elements 10 can be spliced to form a standard circular arc surface. Therefore, in one aspect, aesthetic appearance of the hinge 20 can be improved, and in another aspect, various areas of the hinge 20 can be smooth for transition. When the hinge 20 is applied to a mobile terminal with a flexible screen, it is not easy for the hinge 20 to cause local stress concentration on the flexible screen and consequent damage to a structure of the flexible screen. In addition, this reduces a possibility of causing pain in a user's body due to local stress concentration on the user's body, which helps improve user-friendliness.

As shown in FIG. 3, the hinge 20 in this embodiment further includes a first fastening holder 40 and a second fastening holder 50. Two hinge elements 10 at two ends of the hinge 20 are respectively connected to the first fastening holder 40 and the second fastening holder 50. The hinge 20 can be detachably connected to another structural member through the first fastening holder 40 and the second fastening holder 50. In this way, the hinge 20 in this embodiment does not need to be directly connected and fastened to the another structural member through the hinge element 10, thereby effectively protecting the hinge element 10 and reducing wear and tear of the hinge element 10. The first fastening holder 40 and the second fastening holder 50 in this embodiment each are provided with a mounting hole matching the shape of the connecting clevis pin 30. After the connecting clevis pin 30 is plug into the mounting hole, the connecting clevis pin 30 cannot rotate in the mounting hole. The connecting clevis pin 30 and the mounting hole in this embodiment may use an interference fit. When an external force is applied to the first fastening holder 40 and the second fastening holder 50 so that the first fastening holder 40 and the second fastening holder 50 are close to or away from each other, the first fastening holder 40 and the second fastening holder 50 can jointly drive all hinge elements 10 to rotate around the connecting clevis pin 30, and at the same time, the connecting clevis pin 30 moves and switches between the second locking hole 111 and the first locking hole 110.

Figure 10:
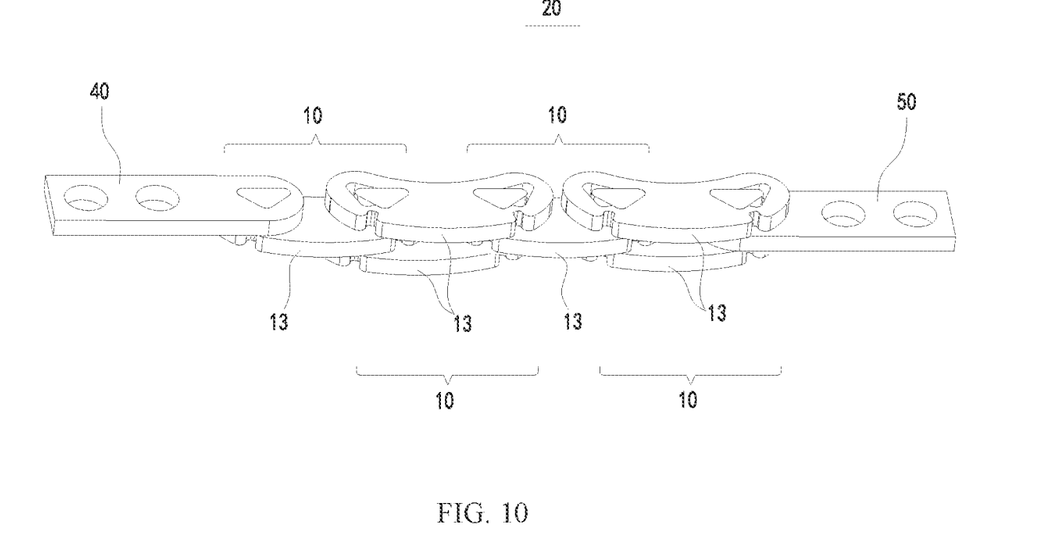
FIG. 10 is a schematic structural diagram of a hinge according to another embodiment of the present disclosure.
Figure 11:
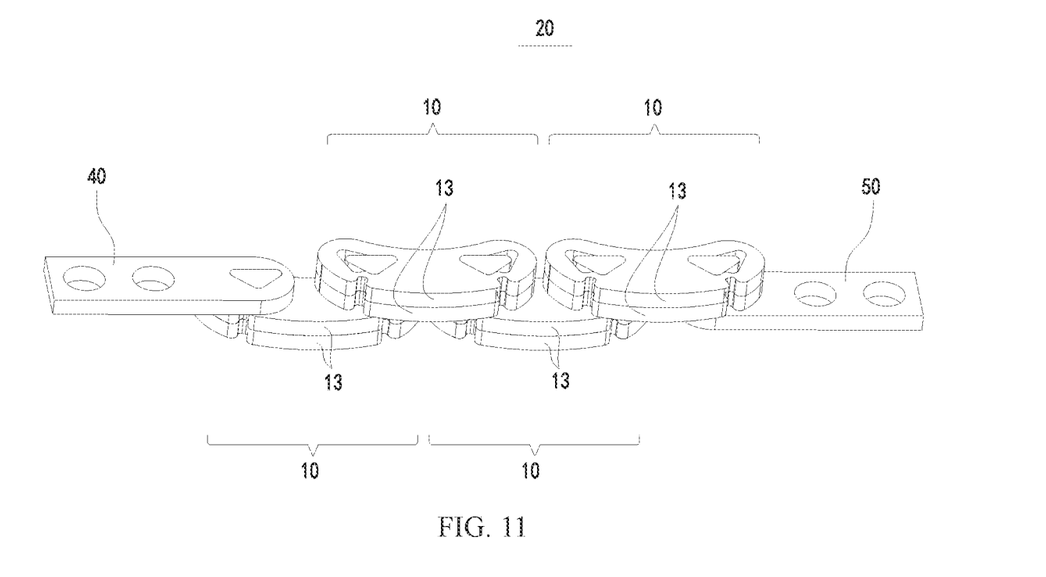
FIG. 11 is a schematic structural diagram of a hinge according to still another embodiment of the present disclosure.

FIG. 10 schematically shows a structure of a hinge 20 according to another embodiment of the present disclosure. FIG. 11 schematically shows a structure of a hinge 20 according to still another embodiment of the present disclosure. In one embodiment, as shown in FIG. 9, in two adjacent hinge elements 10, one hinge element 10 includes a sheet 13, and the other adjacent hinge element 10 includes two sheets 13 spaced in an axial direction of the connecting clevis pin 30. One connecting clevis pin 30 is connected to three hinge elements 10 at the same time. In another embodiment, as shown in FIG. 10, in two adjacent hinge elements 10, each hinge element 10 includes two sheets 13 stacked in an axial direction of the connecting clevis pin 30. One connecting clevis pin 30 is connected to four hinge elements 10 at the same time. It is easy to understand that, in two adjacent hinge elements 10, a quantity of sheets 13 included in one hinge element 10 may be equal to or different from a quantity of sheets 13 included in the other hinge element 10, so that the quantity of sheets 13 can be selected flexibly according to actual product requirements.

Figure 12:
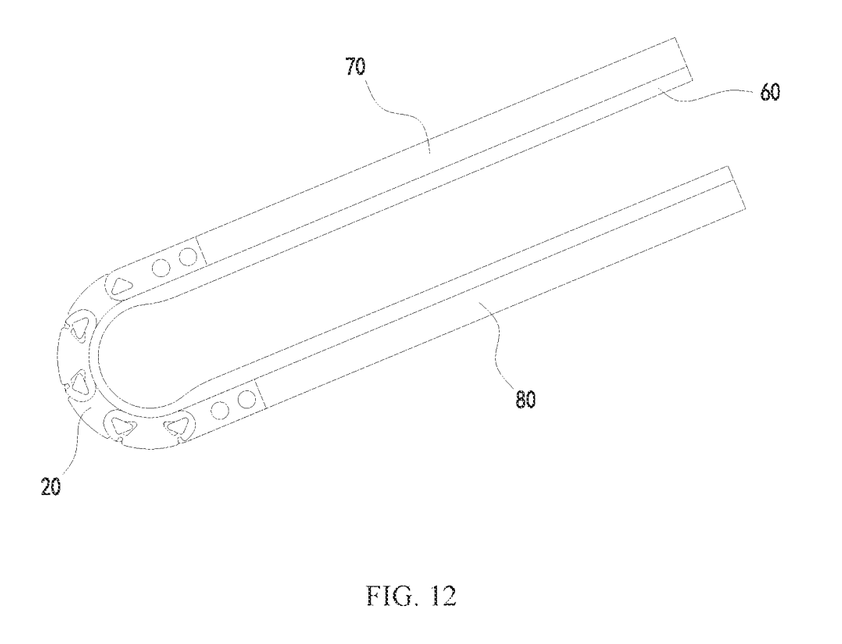
FIG. 12 is a schematic structural diagram of a mobile terminal according to an embodiment of the present disclosure.

FIG. 12 schematically shows a structure of a mobile terminal according to an embodiment of the present disclosure. As shown in FIG. 12, an embodiment of the present disclosure further provides a mobile terminal. The mobile terminal in this embodiment includes a flexible screen 60, a first support 70, a second support 80, and the hinge 20 according to the foregoing embodiment. The first support 70 and the second support 80 are both connected to a non-display surface of the flexible screen 60 to provide support for the flexible screen 60. Two hinge elements 10 at two ends of the hinge 20 are respectively connected to the first support 70 and the second support 80. In one embodiment, two hinge elements 10 at two ends of the hinge 20 are directly connected to the first support 70 and the second support 80, respectively. In another embodiment, two hinge elements 10 at two ends of the hinge 20 are indirectly connected to the first support 70 and the second support 80 through a first fastening holder 40 and a second fastening holder 50, respectively. The first support 70 and the second support 80 can be close to or far away from each other, so as to open or fold the flexible screen 60 and keep the hinge element 10 in a bent state or an open state.

According to the mobile terminal in this embodiment of the present disclosure, the hinge 20 included in the mobile terminal can ensure that a total length L1 of the hinge 20 in an unfolded state is less than a total length L2 of the hinge 20 in the bent state. Therefore, the hinge 20 in the unfolded state has no length redundancy, preventing wrinkles or bends when the hinge is in the unfolded state, and reducing a possibility of damage to a structure of the flexible screen 60 caused by the hinge 20 applying local stress to the flexible screen 60. In addition, the hinge 20 in this embodiment has a simple structure, and processing and manufacturing difficulty is low, so that production costs of the hinge 20 are low and overall production costs of the mobile terminal are low.

Although the present disclosure is already described with reference to the optional embodiments, various modifications may be made to them and equivalents may be used to replace components therein, without departing from the scope of the present disclosure. Especially, as long as there is no structure conflict, technical features mentioned in the embodiments can be combined in any manner. The present disclosure is not limited to specific embodiments disclosed in the specification, but includes all technical solutions falling into the scope of the claims.

What is claimed is:

1. A hinge, comprising:
at least two hinge elements, wherein each of the at least two hinge elements comprises at least one connection hole, the connection hole comprises a first locking hole and a second locking hole that are connected to each other, and a communicating position between the first locking hole and the second locking hole narrows for transition; and
a connecting clevis pin;
wherein the at least two hinge elements are arranged one after another; two adjacent hinge elements are rotatably connected by using the connecting clevis pin, and the connecting clevis pin is switchable between the first locking hole and the second locking hole and locked in the first locking hole or the second locking hole; and when the hinge is in an unfolded state, the connecting clevis pin is locked in the first locking hole, or when the hinge is in a bent state, the connecting clevis pin is locked in the second locking hole; and a total length of the hinge in the unfolded state is less than a total length of the hinge in the bent state;
wherein when the connecting clevis pin is locked in the first locking hole, a portion of the connecting clevis pin is located in the first locking hole, and another portion of the connecting clevis pin extends into the second locking hole; and when the connecting clevis pin is locked in the second locking hole, a portion of the connecting clevis pin is located in the second locking hole, and another portion of the connecting clevis pin extends into the first locking hole.

2. The hinge according to claim 1, wherein a cross section of the connecting clevis pin is in a shape of a triangle, and a vertex angle and two base angles of the triangle are arc-shaped for transition.

3. The hinge according to claim 2, wherein the cross section of the connecting clevis pin is in a shape of an isosceles triangle.

4. The hinge according to claim 1, further comprising a first fastening holder and a second fastening holder, wherein two hinge elements at two ends of the hinge are respectively connected to the first fastening holder and the second fastening holder.

5. The hinge according to claim 1, wherein the each hinge element comprises two connection holes respectively disposed at two ends of the hinge element along a length direction of the hinge element.

6. The hinge according to claim 5, wherein a first distance between two first locking holes of the two connection holes is less than a second distance between two second locking holes of the two connection holes.

7. The hinge according to claim 6, wherein when two connecting clevis pins connecting a same hinge element are locked in the two first locking holes, an axis distance between the two connecting clevis pins is H1; when the two connecting clevis pins are locked in the two second locking holes, an axis distance between the two connecting clevis pins is H2; and the distance H1 is less than the distance H2.

8. The hinge according to claim 1, wherein a hinge element further comprises a deformable protrusion formed on an inner surface of a connection hole of the hinge element.

9. The hinge according to claim 8, wherein the hinge element further comprises a concave portion that is formed in the inner surface of the connection hole of the hinge element and is corresponding to the protrusion.

10. The hinge according to claim 9, wherein a shape of the portion of the connecting clevis pin located in the first locking hole is matched with a shape of the first locking hole, and a shape of the portion of the connecting clevis pin located in the second locking hole is matched with a shape of the second locking hole.

11. A mobile terminal, comprising a flexible screen, a first support, a second support, and the hinge according to claim 1,
wherein
the first support and the second support are both connected to the flexible screen, and two hinge elements at two ends of the hinge are respectively connected to the first support and the second support, and when the hinge is switched between the unfolded state and the bent state, the first support and the second support are close to or far away from each other to unfold or bend the flexible screen.

12. The hinge according to claim 1, wherein the first locking hole is same as the second locking hole in terms of structures.

13. The hinge according to claim 1, wherein the hinge element has an arc-shaped structure.

14. The hinge according to claim 1, wherein the hinge element comprises one sheet, or the hinge element comprises at least two sheets, and the at least two sheets are arranged in an axial direction of the connection hole.

15. The hinge according to claim 1, wherein a hole wall of the connection hole comprises a first arc-shaped surface, a second arc-shaped surface, and a third arc-shaped surface, two ends of the first arc-shaped surface are respectively smoothly and transitionally connected to the second arc-shaped surface and the third arc-shaped surface, two mutually adjacent ends of the second arc-shaped surface and the third arc-shaped surface are smoothly and transitionally connected to each other and form a protrusion protruding toward the first arc-shaped surface, the protrusion has a deformable structure, a corresponding area between the protrusion and the first arc-shaped surface is a narrowed transition area, and bending directions of the first arc-shaped surface, the second arc-shaped surface, and the third arc-shaped surface are same.

16. The hinge according to claim 15, further comprising a concave portion provided corresponding to the protrusion, wherein the concave portion is recessed from an outer surface of the hinge element toward the protrusion.

17. The hinge according to claim 15, wherein a top surface of the protrusion facing the first arc-shaped surface is a circular arc surface, and a top surface of the first arc-shaped surface facing the protrusion is a circular arc surface.

* * * * *